UNITED STATES PATENT OFFICE.

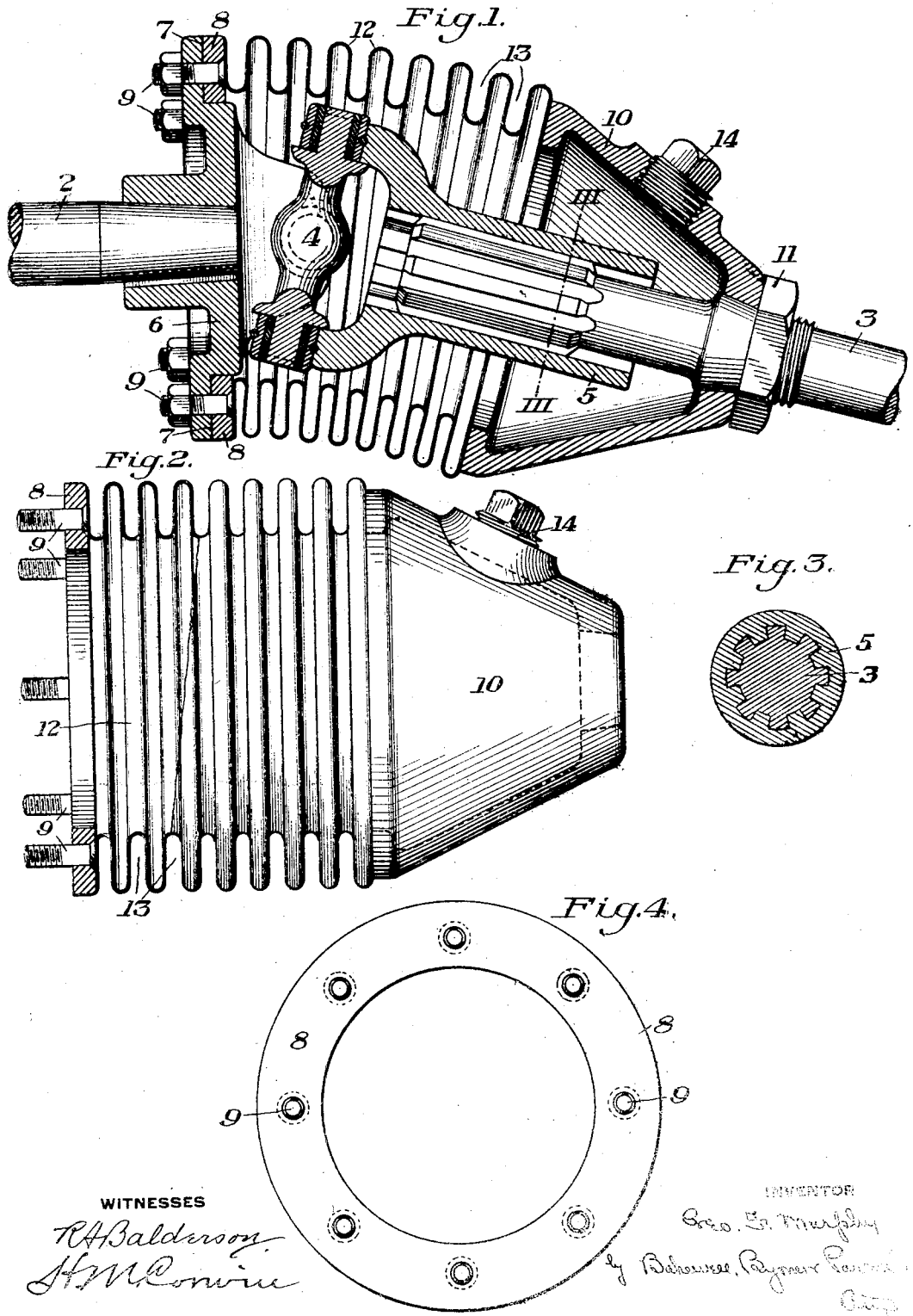

GEORGE F. MURPHY, OF PITTSBURGH, PENNSYLVANIA.

CASING FOR SHAFT-JOINTS.

1,352,019.   Specification of Letters Patent.   Patented Sept. 7, 1920.

Application filed October 29, 1918. Serial No. 260,083.

*To all whom it may concern:*

Be it known that I, GEORGE F. MURPHY, a citizen of the United States, residing at Pittsburgh, Allegheny county, Pennsylvania, have invented a new and useful Improvement in Casings for Shaft-Joints, of which the following is a full, clear, and exact description, reference being had to the accompanying drawings, forming part of this specification, in which—

Figure 1 is a longitudinal section of the device embodying my invention.

Fig. 2 is a detail view partly in section and partly in elevation, with a portion of the device attached.

Fig. 3 is a section on the line III—III of Fig. 1, and

Figure 4 is a plan view of the ring member.

My invention has relation to casings for shaft joints, and while adapted for use generally wherever it is desired to so incase a shaft joint as to enable it to retain lubricating material without leakage, has been more particularly designed for use in connection with the jointed shafts of automobile drives.

My invention provides a casing of this character which is capable of flexing sufficiently to adapt itself to the various movements of the shaft members relatively to each other; which will enable the joint to be surrounded by a lubricant and will retain the same without leakage; and which is simple in its construction.

Referring to the accompanying drawing in which I have illustrated a preferred embodiment of my invention, the numerals 2 and 3 designate shaft members which are connected by a universal joint 4 of any well-known type, the shaft 3 being designed to move freely within the required limits with respect to the member 2. That portion of the joint carried by the member 3 is formed by a sleeve 5 which has a fluted engagement with the end portion of the shaft member so as to permit endwise movement of said member in said sleeve. My invention, however, is not concerned with the particular character of the universal joint, since it is applicable to various forms of such joints.

Secured to the end portion of the shaft member 2 is a disk or flange 6 whose inner surface is shaped to form the annular peripheral seat 7 for a ring 8, the ring 8 being secured to the flange or disk 6 by a plurality of bolts 9. 10 is a casing member which is detachably secured to the shaft section 3 by any suitable means such as the nut 11. 12 designates a flexible casing member which is formed of some durable material which is sufficiently flexible to enable it to readily adapt itself to the different positions of the shaft member 3 with respect to the shaft member 2. It may, for instance, consist of sheet copper having the deep U-shaped, bellows-like corrugations 13. One end of this casing member is securely fastened to the ring 8, preferably by brazing, and its other end is similarly fastened to the inner end of the casing member 10. The latter is shown as having a filling opening normally closed by a plug 14, and through which a lubricant may be introduced to the interior of the casing.

It will be readily seen that it would be impossible for oil to be thrown out of this casing so long as it remains intact; and the flexibility of the portion 12 enables the casing to readily follow the movements of the shaft member 3.

When desired, the nuts may be removed from the bolts 9, and by unscrewing the nut 11 the casing parts 10 and 12 may be removed as a unit, as shown in Fig. 2.

The advantages of my invention will be apparent from the foregoing since it provides a simple and efficient casing of the desired character. I did not limit myself to the particular construction and arrangement of the parts which I have herein shown and described, as it will be obvious that various changes may be made therein without departing from the spirit and scope of my invention as defined in the appended claims.

I claim:

1. The combination with two shaft members connected by a universal joint, and one of said members also having a longitudinal slip-joint therein, of an oil-tight flexible casing connected to said members to rotate therewith and entirely surrounding and inclosing said joint, together with means whereby lubricant may be introduced into said casing, substantially as described.

2. The combination with two shaft sections connected by a universal joint, and one of said members having a longitudinal slip-joint therein, a rigid member rigidly secured to each shaft section to rotate therewith, and a corrugated flexible casing secured at each end to one of said rigid members to rotate therewith and entirely inclosing and surrounding the said joints, said casing having an oil-tight connection with said members and said members having an oil-tight connection with their respective shaft sections, together with means whereby a lubricant may be introduced into the casing, substantially as described.

In testimony whereof, I have hereunto set my hand.

GEORGE F. MURPHY.